United States Patent [19]
Haynes, Jr.

[11] 3,838,215
[45] Sept. 24, 1974

[54] SPEAKERS AND CROSSOVER CIRCUIT

[76] Inventor: Edward N. Haynes, Jr., 1020 Ohio St., Lawrence, Kans. 66044

[22] Filed: Apr. 23, 1973

[21] Appl. No.: 349,531

[52] U.S. Cl. .................... 179/1 D
[51] Int. Cl. .................... H04r 3/14
[58] Field of Search .................... 179/1 D, 1 VL, 1 G; 333/28 T

[56] References Cited

UNITED STATES PATENTS

| | | | |
|---|---|---|---|
| 2,084,160 | 6/1937 | Minton | 179/1 D |
| 2,253,186 | 8/1941 | Loye | 179/1 D |
| 2,802,054 | 8/1957 | Corney | 179/1 D |
| 2,832,828 | 4/1958 | Levy | 179/1 D |
| 3,061,676 | 10/1962 | Wirth | 179/1 D |
| 3,457,370 | 7/1969 | Boner | 179/1 D |

OTHER PUBLICATIONS

Crowhurst, Loudspeaker Crossover Design, Audio, July, 1952, p. 43–45.
Moir, Choice of a Crossover Frequency, Audio, April, 1959, p. 22–2224, 79–80.
Crowhurst, High Fidelity Sound Engineering, 1961, p. 104, 107 and 230.

*Primary Examiner*—Kathleen H. Claffy
*Assistant Examiner*—Jon Bradford Leaheey
*Attorney, Agent, or Firm*—Norman G. Steanson, Jr.

[57] ABSTRACT

A basic woofer, tweeter and crossover circuit apparatus is provided for directing lower frequencies to the woofer and higher frequencies to the tweeter with good circuit impedance constancy and with good woofer and tweeter frequency response characteristics. In a modification of the basic circuit an additional circuit is added to boost lower tweeter frequency signals to the tweeter and to further attenuate mid-range tweeter frequency signals to the tweeter. Also provided is a woofer, mid-range tweeter, high-range tweeter and crossover circuit apparatus for directing lower frequencies to the woofer, mid-range frequencies to the mid-range tweeter and high range frequencies to the high-range tweeter with good circuit impedance constancy and with good woofer, mid-range tweeter and high-range tweeter frequency response characteristics.

12 Claims, 3 Drawing Figures

FIGURE I

SPEAKERS AND CROSSOVER CIRCUIT

BACKGROUND OF THE INVENTION

This invention relates to woofers and tweeters with a crossover circuit for directing lower frequencies to the woofer and higher frequencies to the tweeter with good circuit impedance constancy and with good woofer and tweeter frequency response characteristics. This invention also provides a woofer, mid-range tweeter and high-range tweeter with a crossover circuit for directing low frequencies to the woofer, mid-range frequencies to the mid-range tweeter and high frequencies to the high-range tweeter with good circuit impedance constancy and good woofer, mid-range tweeter and high-range tweeter frequency response characteristics.

In the crossover circuit prior art it is known to put an inductor in series with the woofer and a capacitor in series with the tweeter to direct the lower frequency input signals to the woofer and the higher input signal frequencies to the tweeter. It is also known to further add a capacitor in parallel to the woofer and an inductor in parallel to the tweeter to further add to the lower frequencies being directed to the woofer and the higher frequencies being delivered to the tweeter. It is further known to add a series resonant circuit in parallel to a speaker to promote the circuit having good impedance constancy.

However, no prior art has been seen having the instant circuit of FIG. 1 especially with the resistor in series with the tweeter for attenuating mid-range frequency signals to the tweeter and with its shunt capacitor for boosting the signal to the tweeter at higher frequencies. Also the circuit added in the FIG. 2 circuit for boosting the signal to the tweeter at lower tweeter frequencies and for additional attenuation to the tweeter at mid-range tweeter frequencies has not been seen. The FIG. 3 circuit is even more expanded and has not been seen.

It is highly desirable to have a circuit to direct frequencies from an amplifier to their appropriate low and high-range speakers (or low, mid-range and high-range speakers) and at the same time hold the circuit impedance constant for all frequencies. That is, it is highly desirable for the frequency versus circuit impedance curve to be as flat as possible. It is also highly desirable to have the frequency response characteristics of the speakers to be as smooth as possible. That is, it is highly desirable to have the frequency versus speaker energy output response curve as flat as possible. Of course it is highly desirable to accomplish the above as economically as possible.

A problem solved by this invention is that a speakers and crossover circuit apparatus is provided that effectively directs the signal input frequencies to the appropriate speaker and also provides good circuit frequency-impedance constancy and good frequency response characteristics of the speakers.

SUMMARY OF THE INVENTION

A basic woofer, tweeter and crossover circuit apparatus is provided for directing lower frequencies to the woofer and higher frequencies to the tweeter with good circuit impedance constancy and with good woofer and tweeter frequency response characteristics. In a modification of the basic circuit an additional circuit is added to boost lower tweeter frequency signals to the tweeter and to further attenuated mid-range tweeter frequencies signals to the tweeter. Also provided is a woofer, mid-range tweeter, high-range tweeter and crossover circuit apparatus for directing lower frequencies to the woofer, mid-range frequencies to the mid-range tweeter and high-range frequencies to the high-range tweeter with good circuit impedance constancy and with good woofer, mid-range tweeter and high-range tweeter frequency response characteristics. Referring to the drawings:

DETAILED DESCRIPTION OF THE INVENTION

Figure 1:
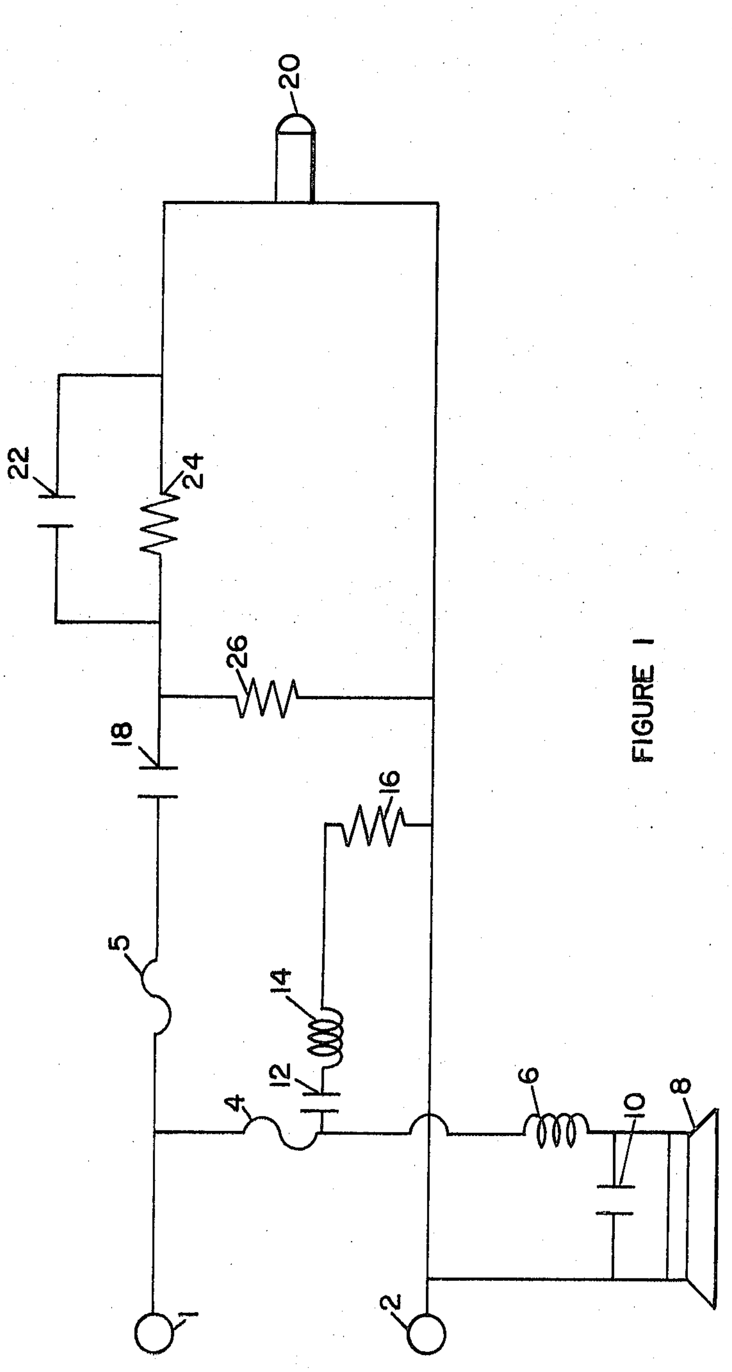
FIG. 1 is a circuit schematic drawing of a woofer, tweeter and crossover circuit apparatus.

Referring in more detail to FIG. 1 the amplifier input comes in to terminal 1 and terminal 2. Fuse 4 and fuse 5 protect the circuits. A first means for directing lower input frequencies to a woofer 8 with good circuit impedance constancy and with good woofer 8 frequency response is provided. In the first means the woofer 8 is coupled to the signal input. Inductor 6 is connected in series with the woofer 8 and capacitor 10 is connected in parallel to the woofer 8, both directing the lower input frequencies to the woofer 8. Inductor 6 reactance increases with increasing frequency and gradually cuts off the woofer 8 above 1,250 Hz. Capacitor 10 and inductor 6 acting together shape the acoustic output of the woofer 8 to provide an energy output level of −3 db at the nominal crossover frequency of 1,250 Hz. A series resonant circuit comprised of series connected capacitor 12, inductor 14 and resistor 16 is coupled in parallel to the inductor 6, capacitor 10 and woofer 8. Capacitor 12 becomes significantly conductive at about 250 Hz and inductor 14 cuts off current therethrough at about 4,000–5,000 Hz. The series resonant circuit has a resonant frequency of approximately 1,200 Hz which coincides with the secondary resonance of the woofer 8 plus inductor 6 and the crossover point of 1,250 Hz sufficiently well to provide smooth circuit impedance throughout the crossover region instead of the characteristic hump. Thus, while inductor 6 and capacitor 10 are levelling off the output of the woofer 8 in the upper woofer 8 range and are providing its desired roll-off rate, the woofer 8 impedance smoothing network consisting of capacitor 12, inductor 14 and resistor 16 are holding the system impedance between 4 and 7.5 ohms through the crossover region. It is imperative when using a transistor amplifier that the speaker system impedance not be allowed to fall significantly below 4 ohms at any frequency, because of the danger of thermal over-load to the amplifier. At resonance, the fundamental resistance of the series resonant circuit is that of resistor 16 plus the slight coil resistance of inductor 14. Thus, the woofer 8 circuit in parallel with this network provides a system impedance of slightly higher than 4 ohms at its minimum. If one has good upper woofer 8 roll-off characteristics either inherent in the woofer itself or through mechanical weighting or damping techniques (as is oftentimes the case) a woofer roll-off inductor 6 need not be used. When a woofer inductor 6 is not employed, the woofer shorting capacitor 10 cannot be used of course for it would be literally a "shorting" capacitor and would short the amplifier output. Even when inductor 6 and capacitor 10 are eliminated, there will still be a considerable impedance rise in the upper woofer 8 range and at the crossover point attributable to the natural rise in impedance near the woofer's 8 secondary resonance frequency. Thus, it would be necessary to retain our series resonant circuit in almost any practical case in order to maintain near constant system impedance. Preferably inductor 6 and capacitor 10 are retained.

A second means for directing higher input frequencies to a tweeter 20 with good circuit impedance constancy and with good tweeter 20 frequency response characteristics is provided. The second means has tweeter 20 coupled to the signal input and in parallel with the woofer 8. A capacitor 18 and a resistor 24 are connected in series with tweeter 20. A capacitor 22 is connected in parallel with the resistor 24. The capacitor 22 input lead could also be connected to the input side of capacitor 18 and therefore is thought of as being in shunt relationship to resistor 24 rather than just connected in parallel to resistor 24. A resistor 26 is connected in parallel with the resistor 24, capacitor 22 and tweeter 20. Capacitor 18 onset rate provides a tweeter 20 energy level of –3 db at 1,250 Hz (thus defining the tweeter 20 crossover point) and resistor 26 limits the maximum impedance in the tweeter range to its value or 7.5 ohms, as it is placed in parallel with the tweeter 20 network. Capacitor 22 starts to shunt to the tweeter 20 at about 8,000 Hz. One wants to maintain a flat energy output from the tweeter 20 even at very high frequencies. Since tweeter 20 has more and better sensitivity than the woofer 8 at medium frequencies, it must be attenuated as per resistor 24. A typical value of attenuation reaches a maximum of 5–6 db in the 6 KHz range, where tweeter 20 is experiencing a response peak. As the signal to the tweeter 20 is progressively increased from 8 KHz to 20 KHz the reactance of capacitor 22 lessens, compensating for the gradual decrease in sensitivity above 10 KHz. Total signal boost at 20 KHz relative to the level at 6 KHz is therefore 5–6 db. Circuit impedance reaches a minimum of 4 ohms at 20 KHz because of the complete bypass of resistor 24, giving resistor 26 (7.5 ohms) in parallel with the reactance of capacitor 22 (which is quite small at high frequencies, of course) plus tweeter 20 (nominal 8 ohms). With this tweeter 20 boost circuit one obtains improved mid-range linearity with the full tweeter 20 sensitivity available at very high frequencies while, concomitantly, circuit impedance in the tweeter 20 range is held between 4 and 7.5 ohms at any frequency from 1.25 KHz to 20 KHz. The value of attenuator resistor 24 can be increased as needed without the circuit impedance increasing above the maximum of 7.5 ohms as delimited by parallel resistance 26, of course. The frequency response curve for the tweeter 20 is good with this circuit.

Figure 2:
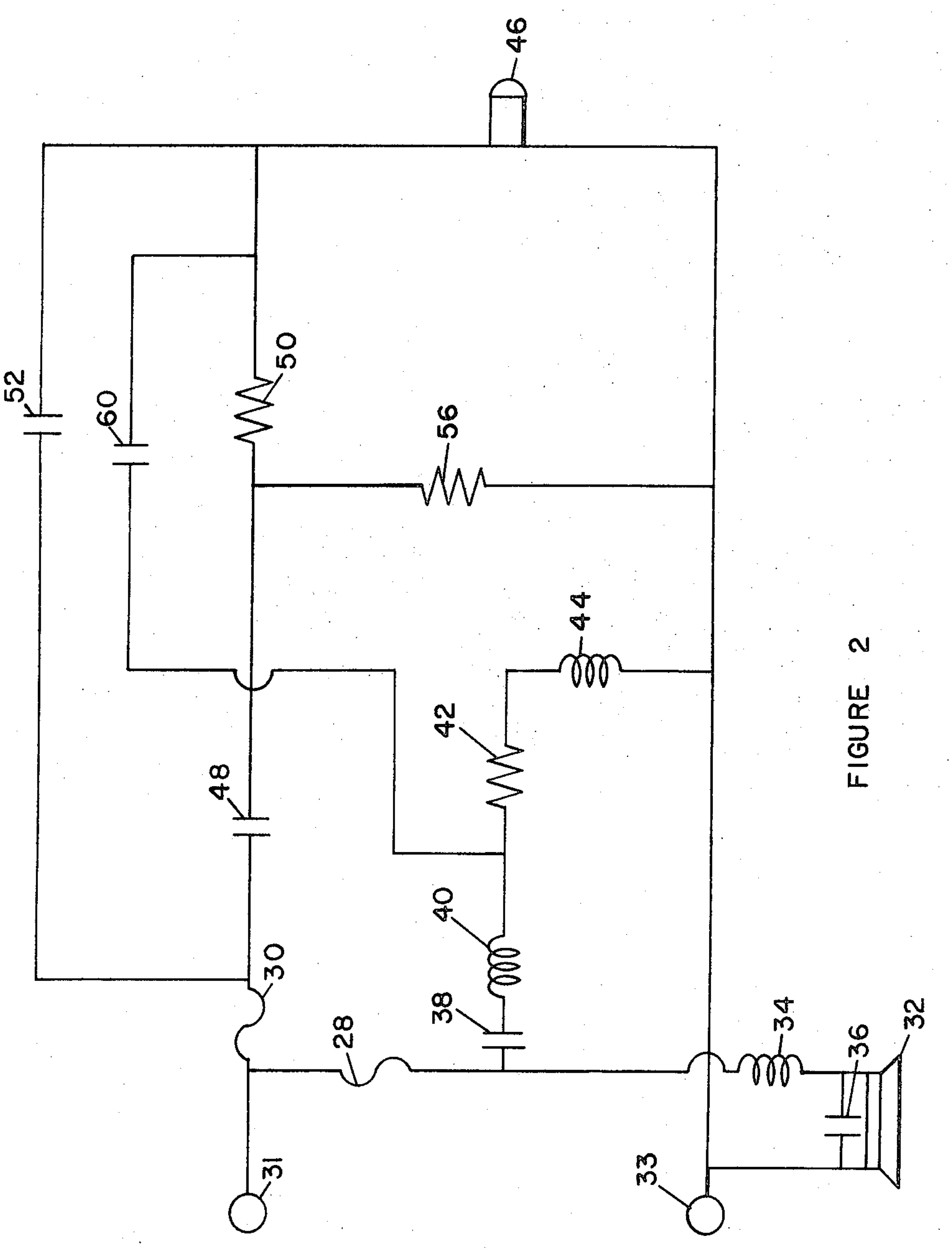
FIG. 2 is a circuit schematic drawing showing a modification of the circuit of FIG. 1.

Refer now in greater detail to FIG. 2 where a modified version of the circuit of FIG. 1 is provided. A third means for directing the lower input frequencies to the woofer 32 with good circuit impedance constancy and with good woofer 32 frequency response characteristics is provided. The third means includes signal input terminals, terminal 31 and terminal 33. Again, fuse 28 and fuse 30 protect the circuit. Woofer 32 is coupled to the signal input. An inductor 34 is connected in series with the woofer 32 and a capacitor 36 is connected in parallel with the woofer 32. Again a series resonant circuit is coupled in parallel with woofer 32, inductor 34 and capacitor 36. However, in this FIG. 2 circuit there are two inductors in the series resonant circuit, inductor 40 and inductor 44 plus capacitor 38 and resistor 42. However, the total inductance of the series resonant circuit is the sum of the inductance of inductor 40 and inductor 44 which is the same as the inductance of inductor 14 of FIG. 1. Thus the series resonant circuit of FIG. 2 works the same as the series resonant circuit of FIG. 1. So the third means (woofer 32 circuit) of FIG. 2 operates in the same way as the first means of FIG. 1. Fourth means for directing the higher input frequencies to the tweeter 46 with good circuit impedance constancy and with good tweeter 46 frequency response characteristics is provided. A tweeter 46 is connected to the signal input and in parallel to woofer 32. A capacitor 48 and resistor 50 are connected in series with the tweeter 46. A resistor 56 is connected in parallel to the tweeter 46 and resistor 50. A capacitor 52 is connected in parallel to the capacitor 48 and resistor 50, and since the capacitor 52 input could also be connected to the output side of capacitor 48 the capacitor 52 is considered merely as being in shunt relationship to resistor 50 rather than strictly in parallel to capacitor 48 and resistor 50. Thus the fourth means of FIG. 2 (tweeter 46 circuit) operates similarly to the second means of FIG. 1 in that the capacitor 48 directs the higher input frequencies to the tweeter 46, the resistor 50 attenuates the tweeter 46 at mid-range input frequencies, the capacitor 52 boosts the signal to the tweeter 46 at higher frequencies and the resistor 56 gives tweeter 46 circuit impedance constancy. The new feature of the circuit of FIG. 2 over the circuit of FIG. 1 is the capacitor 60 connected at one end between the inductor 40 and resistor 42 and at the other end between the resistor 50 and the tweeter 46 for boosting the signal to the tweeter 46 at lower tweeter frequencies and for additional attenuation to the tweeter 46 at mid-range tweeter 46 frequencies. Looking just at the tweeter 46 aspect of inductor 40, inductor 44, resistor 42 and capacitor 38 we see that at frequencies from 2 to 4 KHz an additional boost to the tweeter 46 is provided to compensate for somewhat reduced output in the lower range of some tweeters. Thus, frequencies in this range are given a +3 db boost, (relative to the 6 KHz to 8 KHz level) as determined by the onset frequency of capacitor 60 and the cut-off frequency of inductor 40. At intermediate tweeter 46 frequencies capacitor 60, resistor 42, and inductor 44 provide a 5 to 6 ohm parallel resistance network with the tweeter 46, causing attenuator resistor 50 to have a larger $I^2R$ drop due to the lower tweeter 46 circuit impedance. The additional attenuation in this example amounts to approximately 2 db; and is accomplished without any further increase in system impedance at the point of maximum tweeter 46 attenuation as would be necessary otherwise. In order to avoid too low an impedance when capacitor 52 bypasses the attenuator resistor 50 at high frequencies, inductor 44 is inserted between resistor 42 and ground. At frequencies above 10 KHz, its reactance becomes very large and the capacitor 60 loop circuit essentially disappears, leaving resistor 56 in parallel with just the tweeter 46 as in FIG. 1. Total boost at high frequencies relative to the 6 KHz to 8 KHz region is 8 db in this modification. System impedance is held between 4 and 7.5 ohms at any frequency between 100 Hz and 20 KHz in this circuit, which is excellent. Again, inductor 34 and capacitor 36 could be left out for the reasons explained above pertaining to the first means, but of course are preferably not.

Figure 3:
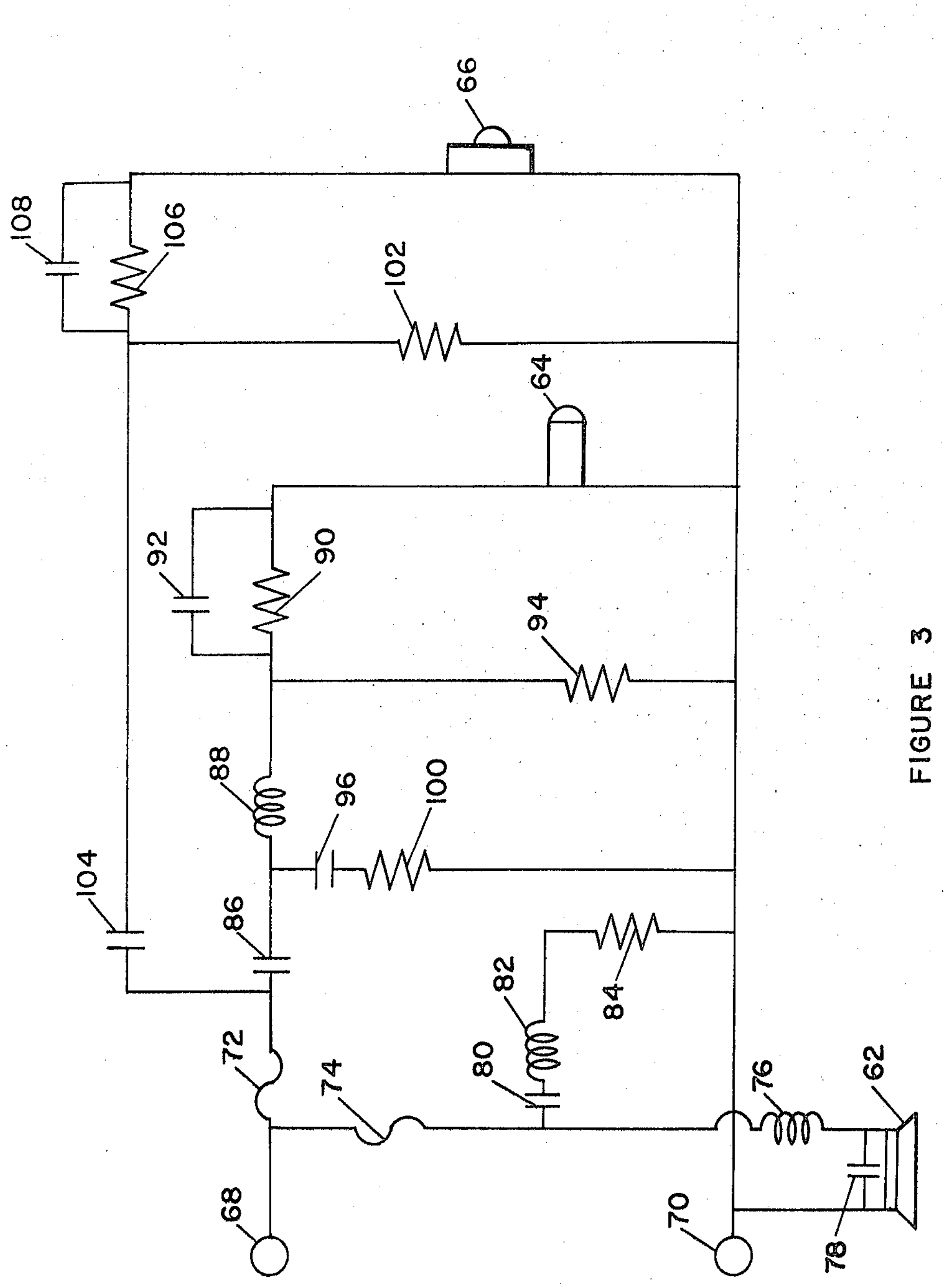
FIG. 3 is a circuit schematic drawing of a woofer, mid-range tweeter, high-range tweeter and crossover circuit apparatus.

Referring now in greater detail to FIG. 3 the first means for directing the low frequencies to the woofer 62 with good circuit impedance constancy and with good woofer frequency response characteristics is shown. The first means of the circuit of FIG. 3 is the same and operates the same as the first means of the circuit of FIG. 1. Note that in FIG. 3 a woofer 62, mid-range tweeter 64, high-range tweeter 66 and crossover circuit apparatus is shown for directing low range frequencies to the woofer 62, mid-range frequencies to the mid-range tweeter 64 and high-range frequencies to the high-range tweeter 66 with good circuit impedance constancy and with good woofer 62, mid-range tweeter 64 and high-range tweeter 66 frequency response characteristics. In the first means of FIG. 3 the amplifier signal input comes in to terminal 68 and terminal 70. Fuse 72 and fuse 74 protect the circuits. Woofer 62 is connected to the signal input. Inductor 76 is connected in series with woofer 62 and capacitor 78 is connected in parallel with woofer 62 for directing the low frequencies to the woofer 62 as described in the description of the operation of the first means of FIG. 1. Again, as described above the inductor 76 and capacitor 78 could be eliminated, but preferably not. Again, a series resonant circuit comprised of series connected capacitor 80, inductor 82 and resistor 84 is connected in parallel to the woofer 62 for woofer 62 circuit impedance constancy as described above in the description of the first means of FIG. 1.

A fifth means for directing the mid-range frequencies to the mid-range tweeter 64 which is connected to the signal input with good circuit impedance constancy and with good mid-range tweeter 64 frequency response characteristics is provided. The fifth means includes a capacitor 86, inductor 88 and resistor 90 connected in series with the mid-range tweeter 64. The capacitor 86 directs the mid-range frequencies to the mid-range tweeter 64. Again the attenuator resistor 90 attenuates the input to mid-range tweeter 64 at medium mid-range frequencies. The inductor 88 cuts off the high-range frequencies to the mid-range tweeter 64 and also attenuates the input to the mid-range tweeter 64 at medium mid-range frequencies. So, inductor 88 provides about 10 db of attenuation in the vicinity of 6 to 8 KHz as well as functioning as a crossover roll-off inductor. Again capacitor 92 is coupled in parallel to the resistor 90 for boosting the signal to the mid-range tweeter 64 at higher mid-range frequencies. Capacitor 92 shorts out about 8,000 Hz and acts as a trimmer capacitor. It is possible to eliminate the capacitor 92 by using a smaller inductance value for inductor 88 but preferably not. This would give a useable performance from the mid range with slightly degraded frequency response at the upper end due to the lower value of the inductance. A resistor 94 is coupled in parallel to the resistor 90, capacitor 92 and mid-range tweeter 64 for mid-range tweeter 64 circuit impedance constancy. A capacitor 96 and resistor 100 are connected in series and connected at one end between the capacitor 86 and inductor 88 and at the other end between the mid-range tweeter 64 and the signal input for mid-range tweeter 64 and tweeter 66 circuit impedance constancy, that is, for impedance smoothing of the circuit at high frequencies where excessive inductance and capacitive effects would otherwise predominate. One could eliminate the capacitor 96 and resistor 100, but preferably not. One could adjust the values of resistor 94 and resistor 102 so that the system impedance could reasonably be maintained without the capacitor 96 and resistor 100 sham network in place. One could not maintain system impedance nearly as well without the capacitor 96 and resistor 100 network but it could still remain superior to the average network in impedance constancy.

Referring further to FIG. 3 a sixth means for directing highrange frequencies to the high-range tweeter 66 with good circuit impedance constancy and with good high-range tweeter 66 frequency response characteristics is provided. In the sixth means the high-range tweeter 66 is connected to the signal input. A capacitor 104 is connected in series with the high-range tweeter 66 and signal input and directs high input frequencies to the high-range tweeter 66. The capacitor 104 cuts in about 8,000 Hz. The capacitor 104 input lead is considered connected to the signal input, rather than on either side of capacitor 86 since it could be connected on either side of capacitor 86. A resistor 106 is coupled in series with the capacitor 104 and the high-range tweeter 66 for attenuating the high-range tweeter 66 input at medium high-range frequencies. A capacitor 108 is coupled in shunt relationship to resistor 106 for boosting the input signal to the high-range tweeter 66 at higher high-range frequencies. The capacitor 108 is considered in shunt relationship to resistor 106 rather than just in parallel to resistor 106 since the capacitor 108 input lead could be connected on either side of capacitor 104. Capacitor 108 cuts in about 16 KHz as the high-range tweeter 66 starts its natural roll-off. These capacitor boost circuits are of a nature to give gradual frequency-response boost curves, not ones having a sharp onset. A resistor 102 is connected in parallel with the resistor 106, capacitor 108 and high-range tweeter 66 for high-range tweeter circuit impedance constancy. The system impedance in this circuit is held between 4 and 7.5 ohms at any frequency from 100 Hz to 20 KHz. At medium frequencies the amplifier sees mostly the resistor 94, resistor 90, resistor 100 and mid-range tweeter 64. At high frequencies the amplifier sees resistor 100, resistor 106, high-range tweeter 66 and resistor 102.

This basic crossover system could be cascaded for four or more speakers to up or down frequencies.

An ideal is to have a constant amplifier speaker load with constant reactance (primarily resistive) which this circuit tries to do. Any of the three crossover circuits herein described hold system impedance within a 2:1 ratio of the rated nominal impedance, or specifically, between 4 to 8 ohms. Modern transistor amplifiers of the low internal impedance, constant voltage output (or high damping factor) type will operate with maximum power output and minimum distortion into loads of this type. The circuits described are specifically designed for a nominal system impedance of 4 ohms and for use with dome-type upper frequency speakers. They can be used; however, with different impedances, multiple upper or lower frequency speakers (or both) or with cone or electrostatic upper range speakers with proper adjustment of the component values.

This invention in its broader aspects is not limited to the specific manufacture shown and described but departure may be made therefrom within the scope of the accompanying claims without departing from the spirit of the invention and without sacrificing its chief advantages.

I claim:

1. A woofer and tweeter coupled in parallel and a crossover circuit apparatus which comprises:

a. a series resonant circuit coupled in parallel to the woofer and woofer circuit impedance constancy;

b. a first capacitor coupled in series with the tweeter for directing the higher input frequencies to the tweeter;

c. a first resistor coupled in series with the first capacitor and tweeter for attenuating the tweeter at mid-range input frequencies;

d. a second capacitor coupled in shunt relationship to the first resistor for boosting the signal to the tweeter at higher frequencies;

e. a second resistor coupled in parallel with the first resistor, second capacitor and tweeter for tweeter circuit impedance constancy;

whereby the lower input frequencies are directed to the woofer and the higher input frequencies are directed to the tweeter with circuit impedance constancy and with woofer and tweeter frequency response constancy.

2. A woofer and tweeter coupled in parallel and a crossover circuit apparatus which comprises:

a. a first inductor coupled in series with the woofer and a first capacitor coupled in parallel with the woofer for directing the lower input frequencies to the woofer;

b. a series resonant circuit coupled in parallel to the first inductor, first capacitor and woofer for woofer circuit impedance constancy;

c. a second capacitor coupled in series with the tweeter for directing the higher input frequencies to the tweeter;

d. a first resistor coupled in series with the second capacitor and tweeter for attenuating the tweeter at mid-range input frequencies;

e. a third capacitor coupled in shunt relationship to the first resistor for boosting the signal to the tweeter at higher frequencies;

f. a second resistor coupled in parallel with the first resistor, third capacitor and tweeter for tweeter circuit impedance constancy;

whereby the lower input frequencies are directed to the woofer and the higher input frequencies are directed to the tweeter with circuit impedance constancy and with woofer and tweeter frequency response constancy.

3. A woofer and tweeter coupled in parallel and a crossover circuit apparatus which comprises:

a. a series resonant circuit having in series a first capacitor, first inductor, first resistor and second inductor all coupled in parallel to the woofer for woofer circuit impedance constancy;

b. a second capacitor coupled in series with the tweeter for directing the higher input frequencies to the tweeter;

c. a second resistor coupled in series with the second capacitor and tweeter for attenuating the tweeter at mid-range input frequencies;

d. a third capacitor coupled in shunt relationship to the second resistor for boosting the signal to the tweeter at higher frequencies;

e. a third resistor coupled in parallel with the second resistor and tweeter for tweeter circuit impedance constancy;

f. a fourth capacitor coupled at one end between the first inductor and first resistor and at the other end between the second resistor and the tweeter for boosting the signal to the tweeter at lower tweeter frequencies and for additional attenuation to the tweeter at mid-range tweeter frequencies;

whereby the lower input frequencies are directed to the woofer and the higher input frequencies are directed to the tweeter with circuit impedance constancy and with woofer and tweeter frequency response constancy.

4. A woofer and tweeter coupled in parallel and a crossover circuit apparatus which comprises:

a. a first inductor coupled in series with the woofer and a first capacitor coupled in parallel with the woofer for directing the lower input frequencies to the woofer;

b. a series resonant circuit having a series a second capacitor, second inductor, first resistor and third inductor all coupled in parallel to the first inductor, first capacitor and woofer for woofer circuit impedance constancy;

c. a third capacitor coupled in series with the tweeter for directing the higher input frequencies to the tweeter;

d. a second resistor coupled in series with the third capacitor and tweeter for attenuating the tweeter at mid-range input frequencies;

e. a fourth capacitor coupled in shunt relationship to he second resistor for boosting the signal to the tweeter at higher frequencies;

f. a third resistor coupled in parallel with the second resistor and tweeter for tweeter circuit impedance constancy;

g. a fifth capacitor coupled at one end between the second inductor and first resistor and at the other end between the second resistor and the tweeter for boosting the signal to the tweeter at lower tweeter frequencies and for additional attenuation to the tweeter at mid-range tweeter frequencies;

whereby the lower input frequencies are directed to the woofer and the higher input frequencies are directed to the tweeter with circuit impedance constancy and with woofer and tweeter frequency response constancy.

5. A woofer, mid-range tweeter and high-range tweeter coupled in parallel and a crossover circuit apparatus which comprises:

a. a series resonant circuit coupled in parallel to the woofer for woofer circuit impedance constancy;

b. a first capacitor, first inductor and first resistor coupled in series with the mid-range tweeter, the first capacitor directing the mid-range frequencies to the mid-range tweeter, and the first resistor attenuating the mid-range tweeter at medium mid-range frequencies, with the first inductor for cutting off the high-range frequencies to the mid-range tweeter and also attenuating the input to the mid-range tweeter at medium mid-range tweeter frequencies;

c. a second resistor coupled in parallel to the first resistor and mid-range tweeter for mid-range tweeter circuit impedance constancy;

d. a second capacitor coupled to the apparatus input signal and coupled in series with the high-range tweeter for directing the high input frequencies to the high-range tweeter;

e. a third resistor coupled in series with the second capacitor and high-range tweeter for attenuating the high-range tweeter at medium high-range frequencies;

f. a third capacitor coupled in shunt relationship to the third resistor for boosting the signal to the high-range tweeter at higher high-range frequencies;

g. a fourth resistor coupled in parallel with the third resistor, third capacitor and high-range tweeter for high-range tweeter circuit impedance constancy;

whereby the lower input frequencies are directed to the woofer, the mid-range input frequencies are directed to the mid-range tweeter and the high-range input frequencies are directed to the high-range tweeter with circuit impedance constancy and with woofer, mid-range tweeter and high-range tweeter frequency response constancy.

6. A woofer, mid-range tweeter and high-range tweeter and a crossover circuit apparatus as recited in claim 5 further comprising:

a. a second inductor coupled in series with the woofer and a fourth capacitor coupled in parallel with the woofer for directing the lower input frequencies to the woofer.

7. A woofer, mid-range tweeter and high-range tweeter and a crossover circuit apparatus as recited in claim 5 further comprising:

a. a fourth capacitor coupled in parallel with the first resistor for boosting the signal to the mid-range tweeter at high mid-range frequencies.

8. A woofer, mid-range tweeter and high-range tweeter and a crossover circuit apparatus as recited in claim 5 further comprising:

a. a fourth capacitor and fifth resistor coupled in series and coupled at one end between the first capacitor and first inductor and at the other end between the mid-range tweeter and the signal input for mid-range tweeter and high-range tweeter circuit impedance constancy.

9. A woofer, mid-range tweeter and high-range tweeter and a crossover circuit apparatus as recited in claim 5 further comprising:

a. a second inductor coupled in series with the woofer and a fourth capacitor coupled in parallel with the woofer for directing the lower input frequencies to the woofer;

b. a fifth capacitor coupled in parallel with the first resistor for boosting the signal to the mid-range tweeter at higher mid-range frequencies.

10. A woofer, mid-range tweeter and high-range tweeter and a crossover circuit apparatus as recited in claim 5 further comprising:

a. a second inductor coupled in series with the woofer and a fourth capacitor coupled in parallel with the woofer for directing the lower input frequencies to the woofer;

b. a fifth capacitor and fifth resistor coupled in series and coupled at one end between the first capacitor and first inductor and at the other end between the mid-range tweeter and the signal input for mid-range tweeter and high-range tweeter circuit impedance constancy.

11. A woofer, mid-range tweeter and high-range tweeter and a crossover circuit apparatus as recited in claim 5 further comprising:

a. a fourth capacitor coupled in parallel with the first resistor for boosting the signal to the mid-range tweeter at higher mid-range frequencies;

b. a fifth capacitor and fifth resistor coupled in series and coupled at one end between the first capacitor and first inductor and at the other end between the mid-range tweeter and the signal input for mid-range tweeter and high-range tweeter circuit impedance constancy.

12. A woofer, mid-range tweeter and high-range tweeter and a crossover circuit apparatus as recited in claim 5 further comprising:

a. a second inductor coupled in series with the woofer and a fourth capacitor coupled in parallel with the woofer for directing the lower input frequencies to the woofer;

b. a fifth capacitor coupled in parallel with the first resistor for boosting the signal to the mid-range tweeter at higher mid-range frequencies;

c. a sixth capacitor and fifth resistor coupled in series and coupled at one end between the first capacitor and first inductor and at the other end between the mid-range tweeter and the signal input for mid-range tweeter and high-range tweeter circuit impedance constancy.

* * * * *